United States Patent [19]

Kishi et al.

[11] Patent Number: 4,506,377
[45] Date of Patent: Mar. 19, 1985

[54] SPOKEN-INSTRUCTION CONTROLLED SYSTEM FOR AN AUTOMOTIVE VEHICLE

[75] Inventors: Norimasa Kishi, Yokohama; Kazunori Noso; Toru Futami, both of Yokosuka, all of Japan

[73] Assignee: Nissan Motor Company, Limited, Japan

[21] Appl. No.: 408,702

[22] Filed: Aug. 16, 1982

[30] Foreign Application Priority Data

Oct. 22, 1981 [JP]  Japan ................. 56-169169

[51] Int. Cl.³ .......................................... G10L 1/00
[52] U.S. Cl. .................................. 381/41; 381/110; 381/86; 219/10.55 B
[58] Field of Search .......................... 381/41–43, 381/86, 110; 340/148; 367/198; 364/424

[56] References Cited

U.S. PATENT DOCUMENTS

| | | | |
|---|---|---|---|
| 4,087,630 | 5/1978 | Browning et al. | 381/43 |
| 4,100,370 | 7/1978 | Suzuki et al. | 381/42 |
| 4,158,750 | 6/1979 | Sakoe et al. | 381/43 |
| 4,214,229 | 7/1980 | Warner | 340/148 |
| 4,340,797 | 7/1982 | Takano et al. | 367/198 X |
| 4,340,798 | 7/1982 | Ueda et al. | 367/198 X |

FOREIGN PATENT DOCUMENTS 916781  1/1963  United Kingdom.

OTHER PUBLICATIONS

D. Raj Reddy, "Speech Recognition by Machine: A Review", Proceedings of the IEEE, vol. 64, No. 4, Apr. 1976.
S. L. Dunik, "Phoneme Recognizer Using Formant Ratios", IBM Technical Disclosure Bulletin, vol. 22, No. 11, Apr. 1980.

*Primary Examiner*—E. S. Matt Kemeny
*Attorney, Agent, or Firm*—Lowe, King, Price & Becker

[57] ABSTRACT

A spoken-instruction controlled system for an automotive vehicle by which a single actuator can be activated repeatedly or a plurality of actuators can be activated sequentially by repeatedly depressing a recognition switch within a predetermined time period after a spoken instruction corresponding to the single actuator or actuators has been recognized by a speech recognizer. Therefore, it is possible to activate an actuator repeatedly or actuators sequentially without uttering the same spoken instruction repeatedly. The spoken-instruction controlled system according to the present invention comprises a two-circuit analog switch, at least one analog switch, at least one retriggerable timer unit, an AND gate, an OR gate, a shift register, etc., in addition to a speech recognizer.

12 Claims, 7 Drawing Figures

FIG.6
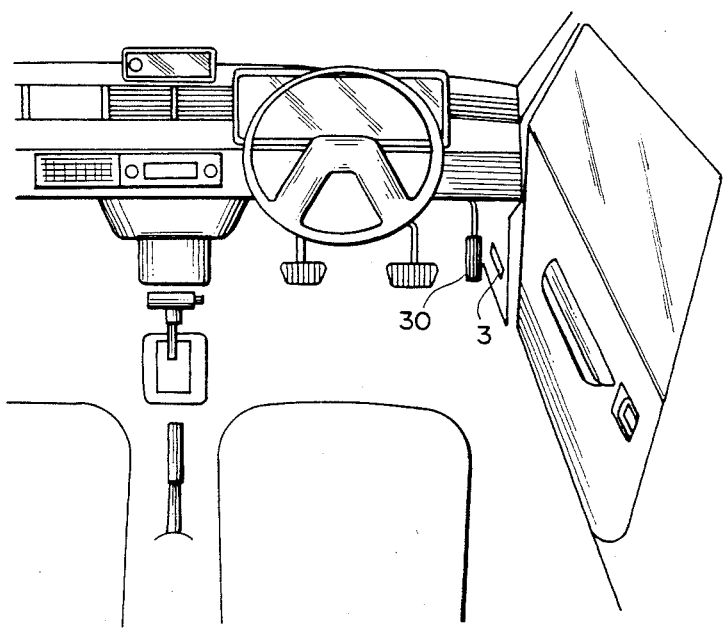
FIG.7
(A)
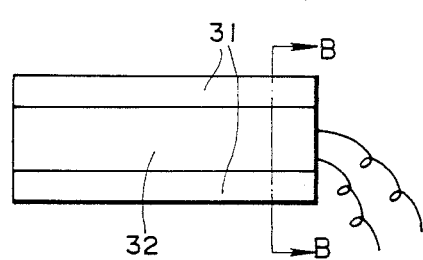
(B)
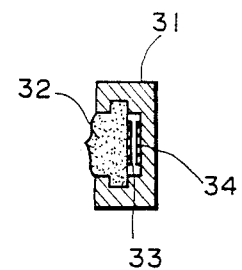

SPOKEN-INSTRUCTION CONTROLLED SYSTEM FOR AN AUTOMOTIVE VEHICLE

BACKGROUND OF THE INVENTION

1. Field of the Invention

The present invention relates generally to a spoken-instruction controlled system for an automotive vehicle, and more specifically to a system for an automotive vehicle which can activate a single actuator repeatedly or actuators sequentially by depressing a recognition switch repeatedly within a predetermined time period after a spoken instruction has been recognized by a speech recognizer.

2. Description of the Prior Art

Conventionally, there is a well-known speech recognizer which can activate various actuators in response to human spoken instructions. When this speech recognizer is mounted on an automotive vehicle, the car radio, for instance, can be turned on or off in response to a driver's spoken instruction such as "Car radio on" or "Car radio off". The speech recognizer is very convenient because various spoken instructions can be recognized in order to control various actuators, without depressing switches; however, there are some problems involved in applying this system to an automotive vehicle. For instance, when the speech recognizer is used for automatically tuning a car radio to a preferable broadcasting station or a preferable program in response to a spoken instruction, since the automatic tuning operation stops at a first station to which a car radio is first tuned, in order to select a preferable broadcasting station or radio program it is usually necessary to utter the same spoken instruction repeatedly and additionally depress the recognition switch repeatedly. These are very troublesome for the driver.

On the stepwise operations as described above, there are various cases such as adjustment of remote-controlled fender mirrors, presetting of fan speeds in an airconditioning system, adjustment of passenger compartment air temperature in the airconditioning system, opening or closing of door windows in a power-operated window system, etc.

Furthermore, in the prior-art speech recognizer, the recognition switch is usually depressed by the hand; however, since the recognition switch should be depressed repeatedly in the case of the speech recognizer of this kind as described above, it is also important to select the position at which the switch is disposed.

A more detailed description of a typical speech recognizer will be made with reference to the attached drawing in conjunction with the present invention under DETAILED DESCRIPTION OF THE PREFERRED EMBODIMENTS.

SUMMARY OF THE INVENTION

With these problems in mind therefore, it is the primary object of the present invention to provide a spoken-instruction controlled system for an automotive vehicle whereby a single actuator can be activated repeatedly or a plurality of actuators can be activated sequentially by depressing only a recognition switch repeatedly within a predetermined time period after a spoken instruction corresponding to the single actuator or a plurality of actuators has been recognized by a speech recognizer, without uttering the same spoken instruction repeatedly.

Further, it is the other object of the present invention to provide a recognition switch which can be depressed by a driver's foot easily, without using the hand.

To achieve the above-mentioned object, the spoken-instruction controlled system for an automotive vehicle according to the present invention comprises a recognition switch depressed when a spoken instruction is inputted to the system and an actuator is activated repeatedly or actuators are activated sequentially, a two-circuit analog switch for switching the recognition switch signal, at least one analog switch for switching a command signal outputted from a speech recognizer to the recognition switch signal or vice versa, at least one retriggerable timer unit for outputting a switch control signal to be applied to the two-circuit analog switch and the analog switch for a predetermined time period, an inverter, an AND or NAND gate, an OR gate, a shift register etc., in addition to a speech recognizer.

To achieve the above-mentioned other object, the recognition switch according to the present invention comprises an elongated channel-shaped member with grooves in the opposing wall, an elastic member with a flange at the end, and a pair of conductive ribbon contacts. Further, the recognition switch according to the present invention is disposed by the side of an accelerator pedal.

BRIEF DESCRIPTION OF THE DRAWINGS

The features and advantages of the spoken-instruction controlled system for an automotive vehicle according to the present invention will be more clearly appreciated from the following description taken in conjunction with the accompanying drawings in which like reference numerals designate corresponding elements or sections throughout the drawings and in which;

FIG. 6 is a perspective pictorial view showing the position at which the recognition switch according to the present invention is disposed;

FIG. 7(A) is a front view showing the recognition switch according to the present invention; and FIG. 7(B) is a cross-sectional view of the recognition switch according to the present invention, taken along the line B—B of FIG. 7(A).

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
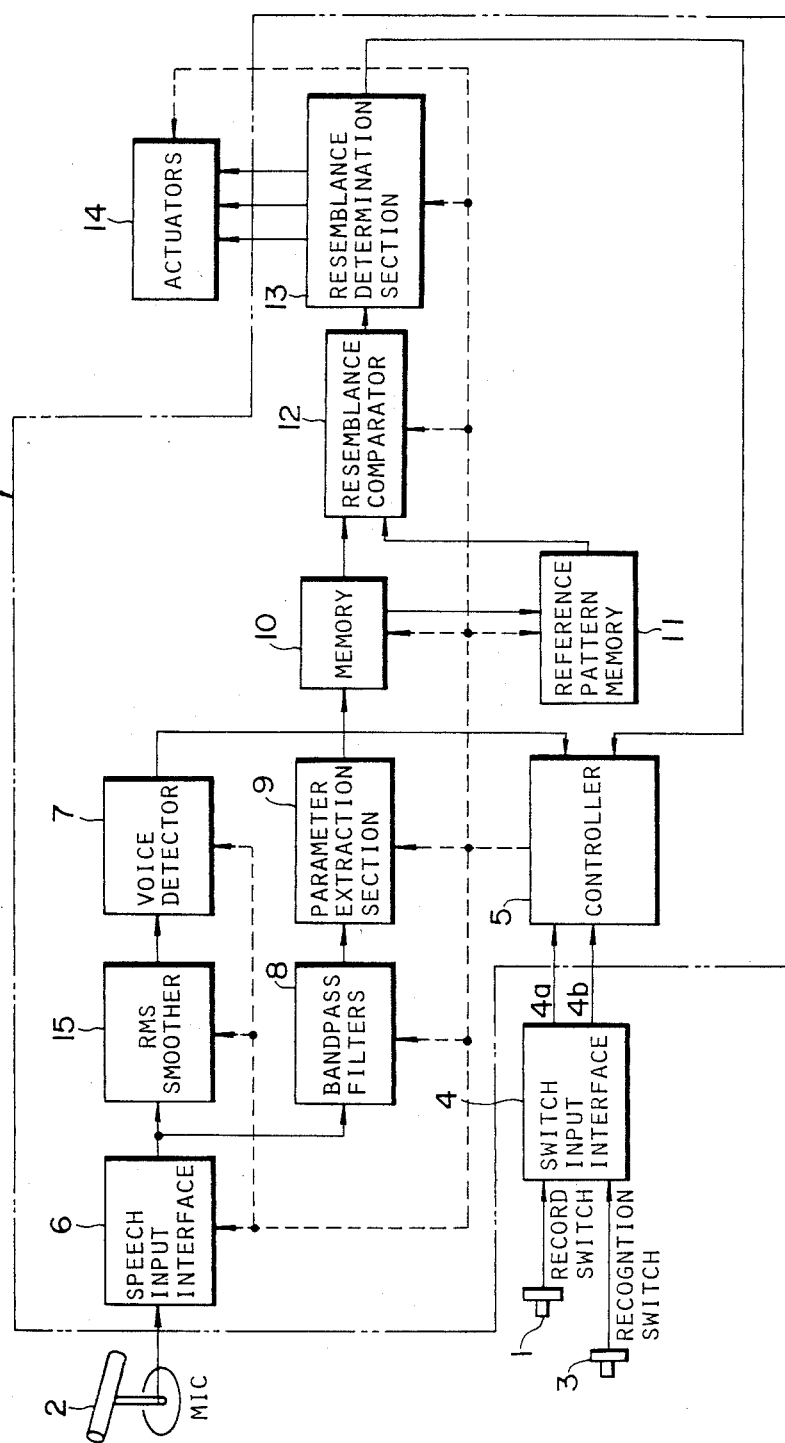
FIG. 1 is a schematic block diagram of a typical speech recognizer for assistance in explaining the operations thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "Car radio on", near a microphone 2, the spoken phrase is transduced into a corresponding electric signal through the microphone 2, amplified through a speech input interface 6 consisting mainly of a spectrum-normalizing amplifier, smoothed through a root-mean-square (RMS) smoother 15 including a rectifier and a smoother, and finally inputted to a voice detector 7. This voice detector 7 detects whether or not the magnitude of the spoken phrase signals exceeds a predetermined level for a predetermined period of time (150 to 250 ms) in order to determine the start of the spoken phrase input signals and whether or not the magnitude of the signals drops below a predetermined level for a predetermined period of time in order to determine the end of the signals. Upon detection of the start of the signals, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectified therein in order to derive the voice power spectrum for each of the frequency bands and then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can input speech instructions, such as "Car radio on", to the speech recognizer through the microphone 2 while depressing a recognition switch 3.

When this recognition switch 3 is depressed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a signal, the spoken instruction is transduced into a corresponding electric signal through the microphone 2, amplified through the speech input interface 6, filtered and divided into voice power spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the inputted speech instruction to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evaluate their cross-correlation. If within the range, a command signal, indicating that a recognition-mode spoken instruction having adequate resemblance to one of the recorded instruction phrases, is outputted to one of actuators 14 in order to turn on the car radio, for instance. The abovementioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. CAR RADIO ON), i denotes the filter index, and j denotes time-series increment index.

If a first recognition-mode speech instruction (e.g. CAR RADIO ON) is denoted by the character "B", the Tchebycheff distance can be obtained from the following expression:

$$l = |F(A) - F(B)| = \sum_{i=1}^{4} \sum_{j=1}^{32} |f^A(i,j) - f^B(i,j)|$$

In the speech recognizer 100 of FIG. 1, when the actuator 14 is used for tuning a car radio to a preferable broadcasting station or program, since the operation of the automatic tuning stops at the first station to which a car radio is first tuned, in order to select a preferable broadcasting station or a preferable radio program from a plurality of stations or programs, the driver must utter the same spoken instruction repeatedly and additionally depress the recognition switch repeatedly.

Further, when a plurality of actuators 14 are used for selecting the car radio channels to which predetermined broadcasting stations have already been set, since the operation of the automatic channel selection stops at the first channel, in order to select a preferable channel, that is, a preferable station, the driver must utter the same spoken instruction releatedly and additionally depress the recognition switch repeatedly.

In view of the above description and with reference to the attached drawings, a first embodiment of the present invention will be explained with respect to its application to an automatic tuning operation and an automatic channel selecting operation in a car radio. In this connection, in the case of an automatic tuning operation, the station tuning operation stops at a first tuned broadcasting station while sweeping from the lower frequency to the higher frequency, when the corresponding spoken instruction is inputted to the system, whereas in the case of an automatic channel selecting operation, the channel selecting operation stops at the next channel to which a broadcasting frequency has previously set, when the corresponding spoken instruction is inputted to the system.

Figure 2:
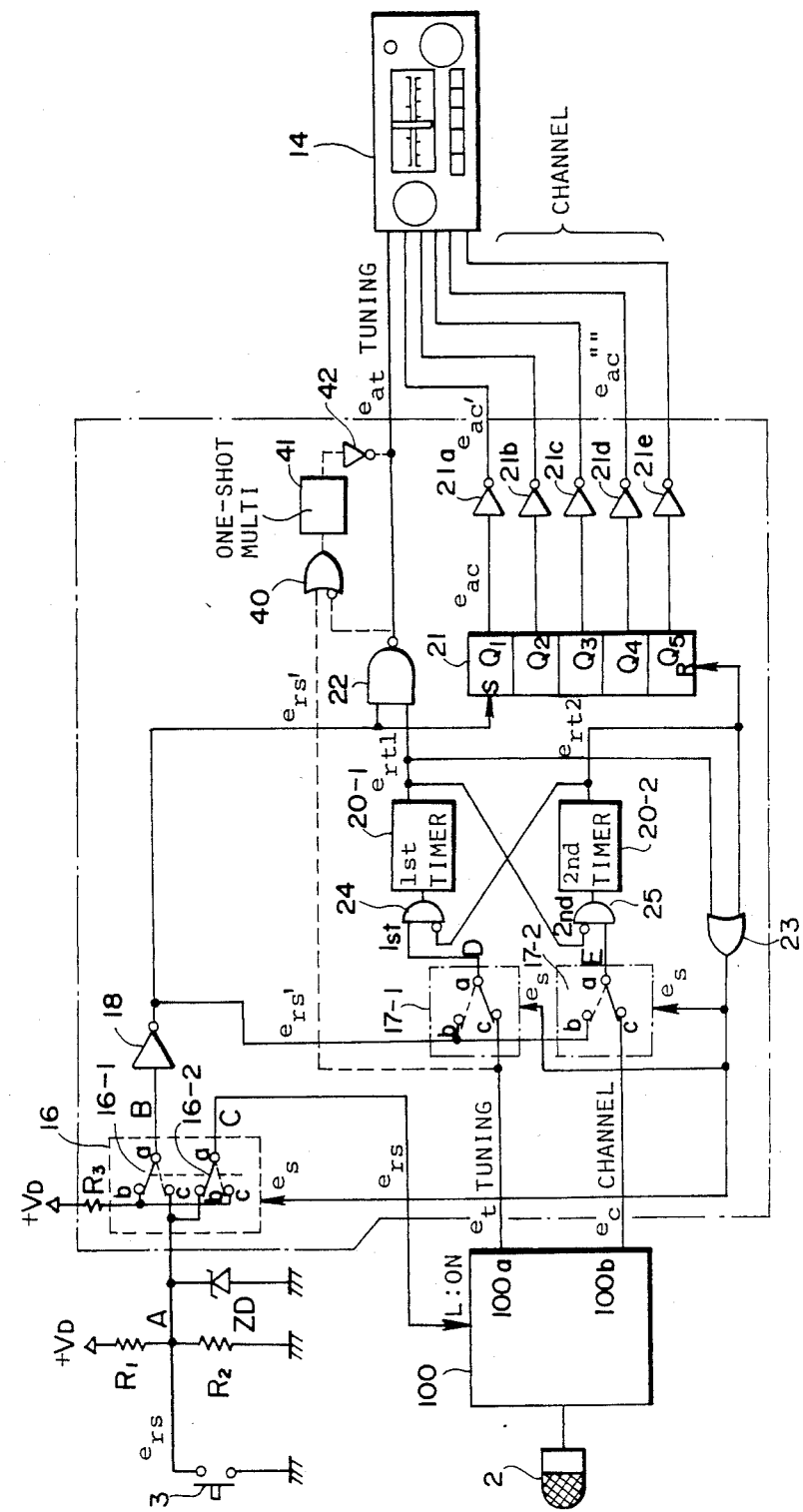
FIG. 2 is a fragmentary schematic block diagram of an essential portion of a first embodiment of the spoken-instruction controlled system for an automotive vehicle according to the present invention.

In FIG. 2, the reference numeral 100 denotes a speech recognizer to which spoken instructions are inputted through a microphone for transducing a spoken phrase into the corresponding electric signal. When recognizing the inputted spoken phrase as a predetermined spoken instruction, the speech recognizer 100 outputs a command signal corresponding to the spoken instruction, as already described hereinabove. In this embodiment, since a car radio 14 (actuator) is controlled by the spoken-instruction controlled system, when a spoken instruction "Tuning" is recognized for automatic broadcasting station tuning operation, the output terminal 100a of the speech recognizer 100 outputs a H-voltage level tuning command signal $e_t$; when a spoken instruction "Channel" is recognized for automatic channel selecting operation, the output terminal 100b thereof outputs a H-voltage level channel command signal $e_c$.

The reference numeral 3 denotes a push-button type recognition switch for outputting a recognition switch signal $e_{rs}$, which is depressed when a spoken instruction is given to the system. To one terminal of the switch 3, a voltage is applied by dividing a power supply voltage $(+V_D)$ with two resistors $R_1$ and $R_2$. Further, a Zener diode ZD is connected in parallel with the resistor $R_2$ in order to absorb the surge voltages due to contact chattering caused when the push-botton switch 3 is depressed. While this push-botton switch 3 is off (released), the potential at point A is at a H-voltage level determined by the two division resistors $R_1$ and $R_2$; while this push-botton switch is on (depressed), the potential at point A is at a L-voltage level (grounded).

The reference numeral 16 denotes a two-circuit analog switch including a first switch unit 16-1 and a second switch unit 16-2 provided with a movable contact a and two fixed contacts b and c each. When a switch control signal $e_s$ is at a L-voltage level, this analog switch 16 is deactivated and set as shown by solid lines in FIG. 2 with the movable contacts a in contact with the fixed contacts b respectively. In this state, accordingly, the potential at point B of the first switch unit 16-1 is at a H-voltage level determined by the supply voltage $(+V_D)$ given via a resistor $R_3$; the potential at point C of the second switch unit 16-2 is at the same voltage level as at point A (H if 3 is off, L if 3 is on). On the other hand, when the switch control signal $e_s$ changes to a H-voltage level, this analog switch 16 is activated and set as shown by broken lines in FIG. 2 with the movable contacts a brought into contact with the other fixed contacts c respectively. In this state, accordingly, the potential at point B of the first switch unit 16-1 changes to the same voltage level as at point A (H if 3 is off, L if 3 is on); the potential at point C of the second switch unit 16-2 changes to the same H-voltage level determined by the supply voltage $(+V_D)$. Further, in this embodiment, since the potential at point C of the second switch unit 16-2 is applied to the speech recognizer 100, the speech recognizer 100 is activated in response to the L-voltage level signal $e_{rs}$ but deactivated in response to the H-voltage level. In more detail, if the switch control signal $e_s$ is at the L-voltage level, only when the recognition push-button switch 3 is kept depressed, the speech recognizer 100 is operative; however, if the switch control signal $e_s$ is at the H-voltage level, the speech recognizer 100 is inoperative, regardless of the depression or release of the recognition push-button switch 3.

The reference numeral 17-1 denotes a first analog switch and the reference numeral 17-2 denotes a second analog switch. The analog switch 17-1 or 17-2 is provided with a movable contact a and two fixed contacts b and c. When the switch control signal $e_s$ is at a L-voltage level, these analog switches 17-1 and 17-2 are set as shown by solid lines in FIG. 2 with the movable contacts a in contact with the fixed contacts b respectively. In this state, accordingly, the potential at point D of the first analog switch 17-1 is at a H-voltage level $e_t$ only when a spoken instruction "Tuning" is recognized; the potential at point E of the second analog switch 17-2 is at a H-voltage level $e_c$ only when a spoken instruction "Channel" is recognized. On the other hand, when the switch control signal $e_s$ changes to a H-voltage level, these analog switches 17-1 and 17-2 are set as shown by broken lines in FIG. 2 with the movable contacts a brought into contact with the other fixed contacts c respectively. In this state, accordingly, the potentials at point D and E of the first and second analog switches 17-1 and 17-2 change to a L-voltage level $e_{rs}'$ when the push-button switch 3 is off but a H-voltage level when the push-button switch 3 is on, because an inverter is connected between the first two-circuit analog switch 16 and the first or second analog switch 17-1 or 17-2.

The reference numeral 20-1 denotes a first retriggerable timer unit and the reference numeral 20-2 denotes a second triggerable timer unit. The retriggerable timer unit outputs a H-voltage level signal $e_{rt1}$ or $e_{rt2}$ for a predetermined time period when the input terminal thereof changes from a L-voltage level to a H-voltage level. Further, this retriggerable timer unit can be retriggered when a H-voltage level signal is applied thereto even after having been triggered, that is, even while outputting a H-voltage level signal. When retriggered, the timer unit keeps outputting again the H-voltage level signal for the predetermined time period beginning from the time when retriggered.

The reference numeral 21 denotes a shift register, which is reset (inoperative) when a L-voltage level signal is applied to the reset terminal thereof, but set (operative) when a H-voltage level signal is applied to the reset terminal thereof. When set (operative), the shift register 21 outputs a H-voltage level signal sequentially from the output terminals $Q_1$ to $Q_5$ in response to a H-voltage level signal inputted to the set terminal thereof. In more detail, when the second timer 20-2 outputs a H-voltage level signal to set (operative) the shift register 21 and when the switch control signal $e_s$ is developed, the register 21 outputs H-voltage level signals in sequential order from the output terminals $Q_1$ to $Q_5$ in response to the signals from the recognition switch 3.

The reference numerals 21a to 21e denote inverters for inverting the output signal $e_{ac}$ from the shift register 21. The output terminals of these inverters 21a to 21e are connected to the channel-selection lines of the car radio 14. If the inverter output signal is at a H-voltage level, the channel selection is inhibited; if at a L-voltage level, the channel selection is operated according to the output line at which the signal level changes from a H-voltage level to a L-voltage level.

Although, the channel selection is operated on in response to a L-voltage level signal in this embodiment; however, it is of course possible to activate the channel selecting actuators in response to a H-voltage level signal. In such case, the inverters 21a–21e are unnecessary.

The reference numeral 22 denotes a NAND gate, one input terminal of which is connected to the inverter 18, the other input terminal is connected to the first timer 20-1 and the output terminal of which is connected to the frequency tuning line of the car radio 14. If the NAND gate output signal is at a H-voltage level, the automatic tuning is inhibited; if at a L-voltage level, the automatic tuning is operated.

The reference numeral 23 denotes an OR gate, one input terminal of which is connected to the first retriggerable timer 20-1 and the other input terminal of which is connected to the second retriggerable timer 20-2 in order to output the switch control signal $e_s$ to the two-circuit analog switch 16 and the first and second analog switches 17-1 and 17-2.

Furthermore, the reference numerals 24 and 25 denote a first AND gate and a second AND gate, respectively.

Figure 3:
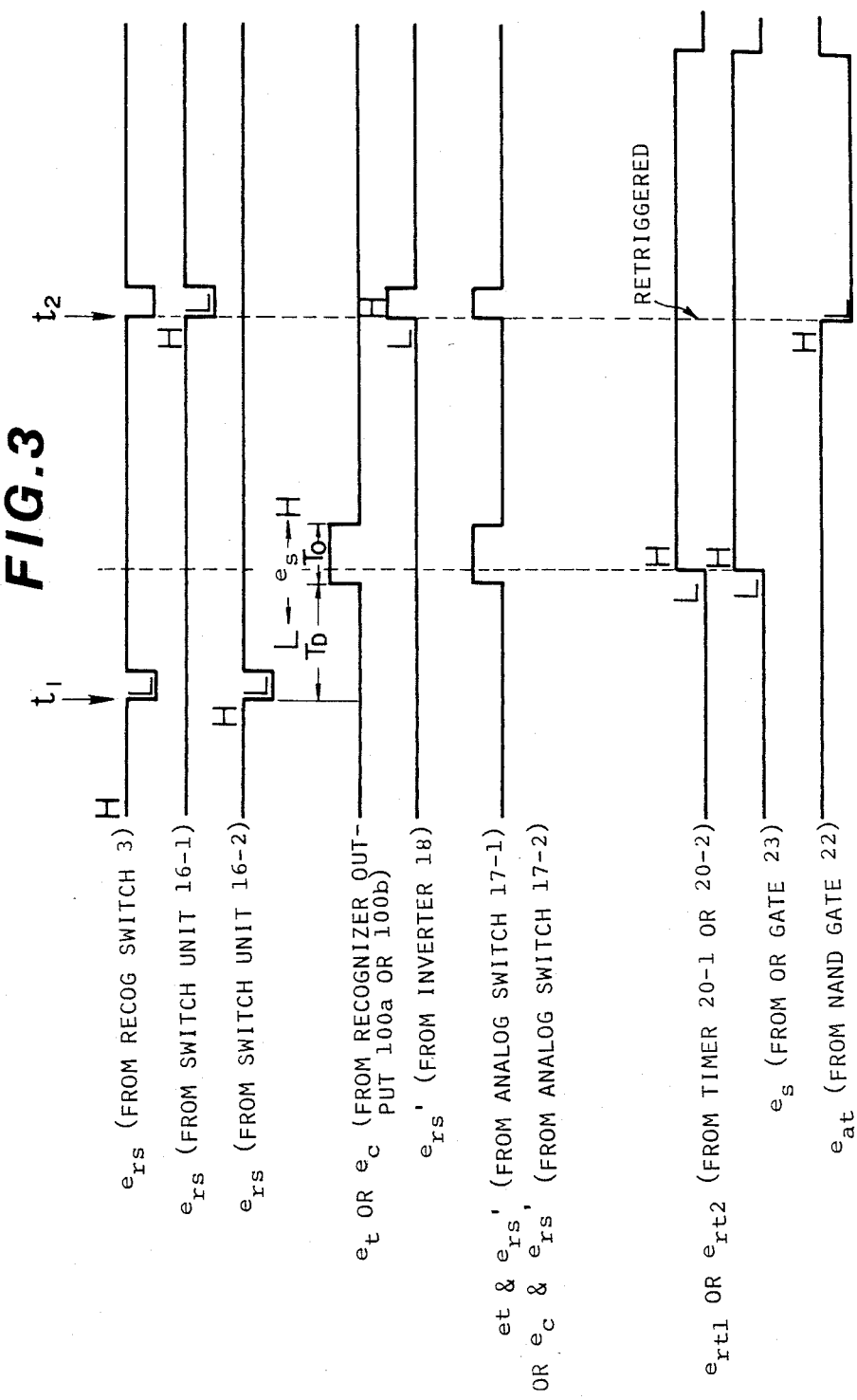
FIG. 3 is a timing chart of the first embodiment of the spoken-instruction controlled system for an automotive vehicle according to the present invention.

Now, the operations of the first embodiment shown in FIG. 2 will be described hereinbelow with reference to the timing chart shown in FIG. 3.

First, the case is explained when automatic tuning operation is performed in accordance with a spoken instruction.

When the recognition switch 3 is depressed at time $t_1$, the output of the switch 3 (point A) changes to a L-voltage level. Therefore, the L-voltage level signal $e_{rs}$ is applied to the speech recognizer 100 via the second switch unit 16-2 of the two-circuit analog switch 16 to keep the speech recognizer 100 operative. In this state (with the switch 3 kept depressed), when a spoken instruction, for instance, "Tuning" is inputted through the microphone 2, this spoken instruction is recognized by the speech recognizer 100, so that the output terminal 100a is kept at a H-voltage level for a predetermined time period $T_o$ after a delay time $T_D$ (some time interval is necessary to detect the start of the spoken instruction). This H-voltage level tuning command signal $e_t$ from the output terminal 100a of the speech recognizer 100 is applied to one input terminal of the first AND gate 24 via the first analog switch 17-1. Since the other inverted input terminal of the AND gate 24 is also at a H-voltage level because the second retriggerable timer unit 20-2 is still kept inoperative with the output terminal at a L-voltage level, the first AND gate 24 outputs a H-voltage level signal to the first retriggerable timer unit 20-1, so that the timer unit 20-1 outputs a H-voltage level signal $e_{rt1}$ for a predetermined time period. Given to one input terminal of the NAND gate 22 and to one input terminal of the OR gate 23, this H-voltage level signal $e_{rt1}$ from the first timer unit 20-1 becomes the switch control signal $e_s$; as a result, the two-circuit analog switch 16 and the first and second analog switches 17-1 and 17-2 are all switched as shown by broken lines in FIG. 2. At this time, since the recognition switch 3 has already been released, a H-voltage level signal is given from the power supply $+V_D$ to the inverter 18; that is, the output signal ($e_{rs}'$) of the inverter 18 is at a L-voltage level. In the NAND gate 22, since one input terminal is at a L-voltage level ($e_{rs}'$ from the inverter 18) and the other input terminal is at a H-voltage level ($e_{rt1}$ from the first retriggerable timer 20-1), the output terminal thereof is at a H-voltage level $e_{at}$, so that the automatic tuning is inhibited. Further, in this state, since a H-voltage level signal is applied from the power supply $+V_D$ to the speech recognizer 100, the speech recognizer 100 becomes inoperative. Furthermore, in this state, since the second analog switch 17-2 has been switched as shown by broken lines by the switch control signal $e_s$, the L-voltage level output signal $e_{rs}'$ from the inverter 18 is applied to one of two input terminals of the second AND gate 25 in order to prevent the second retriggerable timer unit 20-2 from being activated (while the first timer unit 20-1 is H, the other inverted input terminal of the AND gate 25 is L).

Next, when the recognition switch 3 is depressed again at time $t_2$ while the first retriggerasble timer unit 20-1 is outputting a H-voltage level signal $e_{rt1}$ for a predetermined time period after being activated by the command signal $e_t$ from the output terminal 100a, the L-voltage level signal $e_{rs}$ from the recognition switch 3 is inverted by the inverter 18, and the inverted H-voltage level signal $e_{rs}'$ is given to one input terminal of the NAND gate 22 and to one input terminal of the first AND gate 24. Similarly to the case when the output terminal 100a of the speech recognizer 100 is at a H-voltage level, the first retriggerable timer unit 20-1 is retriggered at time $t_2$ in order to output a H-voltage level signal $e_{rt1}$ for the predetermined time period beginning from when retriggered. Further, in this case, although the H-voltage level signal $e_{rs}'$ is also given to one input terminal of the second AND gate 25, since the other inverted input terminal thereof is at a L-voltage level (a H-voltage level first timer signal $e_{rt1}'$ is inverted), the second retriggerable timer unit 20-2 is not activated. As a result, two H-voltage level signals $e_{rs}'$ and $e_{rt1}$ from the inverter 18 and the first timer unit 20-1 are applied to the two input terminals of the NAND gate 22, respectively and thereby the output terminal of the NAND gate 22 changes to a L-voltage level, outputting an actuator signal $e_{at}$ for automatic tuning. In response to this actuator signal $e_{at}$, an electronic tuning device starts tuning by sweeping and stops at the first tuned broadcasting station. If the program of a broadcasting station thus tuned is not preferable, it is possible to perform the automatic tuning operation again by depressing the recognition switch 3 repeatedly within the predetermined time period during which the first retriggerable timer unit 20-1 is kept at a H-voltage level, in the same way as when the recognition switch 3 is depressed at time $t_2$. Therefore, the output terminal of the NAND gate 22 is changed to a L-voltage level only while the recognition switch 3 is kept depressed in order to perform the succeeding automatic tuning operation.

To explain in short, when the switch 3 is first depressed, point A ($e_{rs}$) is L; the speech recognizer 100 becomes operative. When "Tuning" is inputted, the tuning command signal $e_t$ activates the first timer 20-1 to output a timer signal $e_{rt1}$. As a result, the switch control signal $e_s$ switches all the analog switches 16, 17-1, and 17-2 as shown by broken lines. At this moment, since the recognition switch 3 has already been released to H, the inverter 18 ($e_{rs}'$) is L; the first timer 20-1 ($e_{rt1}$) is still H; the NAND gate 22 ($e_{at}$) is H; that is, the automatic tuning is inhibited. Simultaneously, the inverter 18 is connected to the first timer 20-1 so as to be retriggerable in response to the succeeding H-voltage level inverter signal $e_{rs}'$. Next, when the recognition switch 3 is secondly depressed, the inverter 18 ($e_{rs}'$) is H; the first timer 20-1 ($e_{rt1}$) is still H, the NAND gate 22 ($e_{at}$) is L; that is, the automatic tuning begins. The first timer 19 is also retriggered.

Further, in the case where the recognition switch 3 is not depressed again within the predetermined time interval during which the retriggerable timer unit 20-1 is outputting a H-voltage level signal $e_{rt1}$, the output of the first retriggerable timer unit 20-1 returns to a L-voltage level after the predetermined time period, and thereby the output signal $e_s$ of the OR gate 23 also returns to a L-voltage level. As a result, all the analog switches 16, 17-1 and 17-2 are returned to their original position, standing-by the next spoken instruction.

In the first embodiment described above, the automatic tuning starts after the recognition switch 3 is depressed twice; however, in the case where the automatic tuning is required to start in response to the first tuning command signal $e_t$ outputted when the recognition switch 3 is first depressed, an OR gate 40, a one-shot multivibrator 41, and an inverter 42 are additionally connected to the system as shown by broken lines in FIG. 2. One input terminal of the OR gate 40 is connected to the ouput terminal 100a of the speech recognizer 100 for directly receiving the tuning command signal $e_t$; the other inverted terminal thereof is connected to the output of the NAND gate 22.

In this embodiment, when the recognition switch 3 is first depressed and "Tuning" is inputted through the microphone 2, since the speech recognizer 100 outputs a tuning command signal $e_t$, this equal $e_t$ directly triggers the one-shot multivibrator 41 in order to output a H-voltage level signal for a predetermined time period. After inverted through the inverter 42, this L-voltage level signal is applied to the car radio 14 in order to perform the automatic tuning in the car radio 14.

On the other hand, when the inverted H-voltage level signal $e_{rs}'$ from the inverter 18 is inputted to the NAND gate 22 while the first retriggerable timer unit 20-1 is outputting a H-voltage level signal $e_{rt1}$, a H-voltage level signal $e_{at}$ is outputted from the NAND gate 22. After inverted and inputted to the OR gate 40, this signal triggers the one-shot multivibrator 41 in the same way as is directly triggered by the tuning command signal $e_t$.

Secondly, the case is explained when automatic channel selection operation is performed in accordance with a spoken instruction.

When the recognition switch 3 is depressed at time $t_1$, the output of the switch 3 (point A) changes to a L-voltage level. Therefore, the L-voltage level signal $e_{rs}$ is applied to the speech recognizer 100 via the second switch unit 16-2 of the two-circuit analog switch 16 to keep the speech recognizer 100 operative. In this state (with the switch 3 kept depressed), when a spoken instruction, for instance, "Channel" is inputted through the microphone 2, this spoken instruction is recognized by the speech recognizer 100, so that the output terminal 100b is kept at a H-voltage level for a predetermined time period $T_o$ after a delay time $T_D$ (some time interval is necessary to detect the start of the spoken instruction). This H-voltage level channel command signal $e_c$ from the output terminal 100b of the speech recognizer 100 is applied to one input terminal of the second AND gate 25 via the second analog switch 17-2. Since the other inverted input terminal of the AND gate 25 is also at a H-voltage level because the first retriggerable timer unit 20-1 is still kept inoperative with the output terminal at a L-voltage level, the second AND gate 25 outputs a H-voltage level signal to the second retriggerable timer unit 20-2, so that the timer unit 20-2 outputs a H-voltage level signal $e_{rt2}$ for a predetermined time period. Given to the reset terminal R of the shift register 21 and one input terminal of the OR gate 23, this H-voltage level signal $e_{rt2}$ from the second timer unit 20-2 becomes the switch control signal $e_s$; as a result, the two-circuit analog switch 16 and the first and second analog switches 17-1 and 17-2 are all switched as shown by broken lines in FIG. 2. At this time, since the recognition switch 3 has already been released, a H-voltage level signal is given from the power supply $+V_D$ to the inverter 18; that is, the output of the inverter 18 is at a L-voltage level.

Next, when the recognition switch 3 is depressed again at time $t_2$ when the second retriggerable timer unit 20-2 is outputting a H-voltage level signal $e_{rt2}$ for a predetermined time period after being activated by the command signal $e_c$ from the output terminal 100b, the L-voltage level signal $e_{rs}$ from the recognition switch 3 is inverted by the inverter 18, and the inverted H-voltage level signal $e_{rs}'$ is given to the set terminal of the shift register 21 and one input terminal of the second AND gate 25. Similarly to the case when the output terminal 100b of the speech recognizer 100 is at a H-voltage level, the second retriggerable timer unit 20-2 is retriggered at time $t_2$ in order to output a H-voltage level signal $e_{rt2}$ for the predetermined time period beginning from when retriggered. Further, in this case, although the H-voltage level signal $e_{rs}'$ is also given to one input terminal of the first AND gate 24, since the other inverted input terminal thereof is at a L-voltage level (a H-voltage level second timer signal $e_{rt2}$ is inverted), the first retriggerable timer unit 20-1 is not activated. In the shift register 21, since a H-voltage level signal $e_{rt2}$ is given to the reset terminal thereof, the shift register 21 operative. Therefore, while the second retriggerable timer unit 20-2 is outputting a H-voltage level signal $e_{rt2}$, if the recognition switch 3 is depressed again, a H-voltage level signal $e_{rs}'$ inverted through the inverter 18 is applied to the set terminal S of the shift register 21, so that the output terminal $Q_1$ thereof changes to a H-voltage level, with other output terminals $Q_2$ to $Q_5$ thereof kept at a L-voltage level. As a result, the output of the inverter 21a changes to a L-voltage level, outputting an actuator signal $e_{ac}'$ for automatic channel selection. In response to this actuator signal $e_{ac}'$, a station corresponding to this first channel is selected. If the program of the broadcasting station thus selected is not preferable, it is possible to perform the automatic channel selection operation again by depressing the recognition switch 3 within the predetermined time period during which the second retriggerable timer unit 20-2 is kept at a H-voltage level, in the same way as when the recognition switch 3 is depressed at time $t_2$. For instance, if the recognition switch 3 is further depressed three times, the output terminal $Q_4$ of the shift register 21 changes to a H-voltage level, with the other output terminals $Q_1$, $Q_2$, $Q_3$ and $Q_5$ kept at a L-voltage level. As a result, the output of the inverter 21d changes to a L-voltage level, outputting an actuator signal $e_{ac}''''$ for automatic channel selection. In response to this command signal, a station corresponding to the fourth channel is selected. Further, in this state, since a H-voltage level signal is applied from the power supply $+V_D$ to the speech recognizer 100, the speech recognizer 100 becomwes inoperative. Furthermore, in this state, since the second analog switch 17-2 has been switched as shown by broken lines by the switch control signal $e_s$, the H-voltage level output signal $e_{rs}'$ from the inverter 18 is applied to one of two input terminals of the first AND gate 24 in order to prevent the first retriggerable timer unit 20-1 from being activated (while the second timer 20-2 is H, the other input terminal of the AND gate 24 is L).

To explain in short, when the switch 3 is first depressed, point A ($e_{rs}$) is L; the speech recognizer 100 become operative. When "Channel" is inputted, the channel command signal $e_c$ activates the second timer 20-2. As a result, the switch control signal $e_s$ switches all the analog switches 16, 17-1, and 17-2 as shown by broken lines. At this moment, since the recognition switch 3 has already been released to H, the inverter 18 ($e_{rs}'$) is L; the second timer 20-2 is still H; the reset terminal R of the shift register 21 is H; that is, the shift register 21 is operative. Simultaneously, the inverter 18 is connected to the second timer 20-2 so as to be retriggerable in response to the succeeding H signal from the inverter signal $e_{rs}'$. Next, when the recognition switch 3 is secondly depressed, the inverter 18 ($e_{rs}'$) is H; the second timer 20-2 ($e_{rt2}$) is still H, that is, the automatic channel selection begines through the shift register 21. The second timer 20-2 is also retriggered.

Further, in the case where the recognition switch 3 is not depressed again within the predetermined time interval during which the retriggerable timer unit 20-2 is outputting a H-voltage level signal $e_{rt2}$, the output of the second retriggerable timer unit 20-2 returns to a L-voltage level after the predetermined time period, and thereby the output signal $e_s$ of the OR gate 23 also returns to a L-voltage level. As a result, all the analog switches 16, 17-1 and 17-2 are returned to their original position, standing-by the next spoken instruction.

Figure 4:
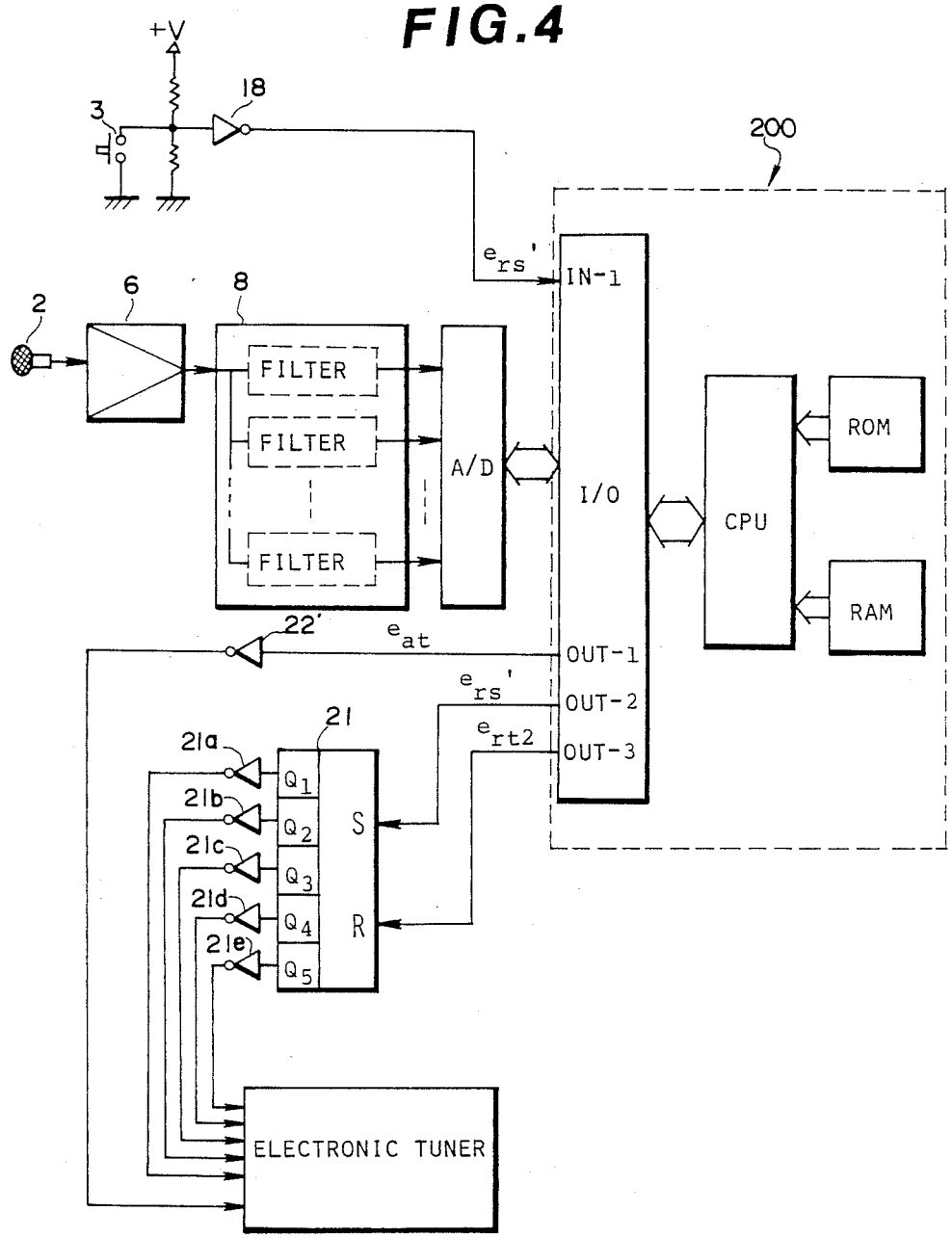
FIG. 4 is a schematic block diagram of a second embodiment of the spoken-instruction controlled system for an automotive vehicle according to the present invention, in which a microcomputer is included.

FIG. 4 shows a second embodiment of the spoken-instruction controlled system according to the present invention, in which a microcomputer is included.

In this embodiment, the functions of the two-circuit analog switches 16, the first and second analog switches 17-1 and 17-2, the first and second retriggerable timer units 20-1 and 20-2, the first and second AND gates 24 and 25, a part of the NAND gate 22, and the OR gate 23 are all incorporated within a microcomputer 200 provided with a central processing unit, a read-only memory, a random-access memory, and input/output interfaces, etc. That is to say, the functions of a part of the spoken instruction controlled system are performed through arithmetic operations executed in accordance with appropriate software, in place of hardware, except the recognition switch 3, the shift register 21, and the inverters 21a to 21e connected to the shift register 21.

Further, in this embodiment, various elements or sections in the speech recognizer 100 such as the RMS smoother 15, the voice detector 7, the parameter extraction section 9, the memory 10, the reference pattern memory 11, the resemblance comparator 12, the resemblance determination section 13, the controller 5, etc. are all incorporated within the microcomputer 200, for performing the same functions as those of the above-mentioned discrete elements or sections in accordance with appropriate programs stored in the microcomputer 200. In this case, the speech input interface 6 consisting mainly of a spectrum-normalizing amplifier, the bandpass filters 8 are connected to the input port of the microcomputer 200 through an analog-to-digital converter.

Figure 5:
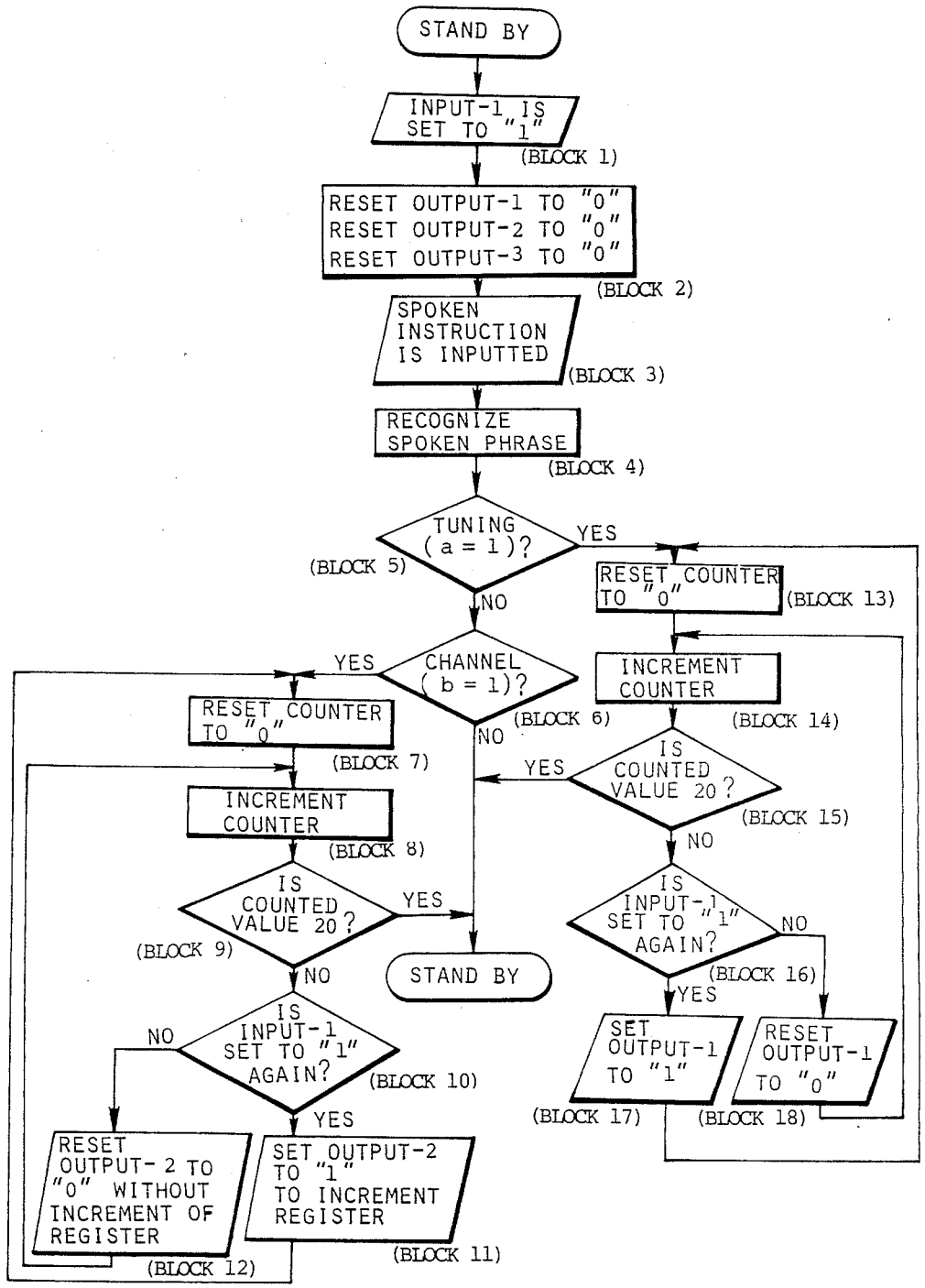
FIG. 5 is a flowchart showing the method of repeatedly activating the same actuator and sequentially activating a plurality of actuators in response to a spoken instruction in accordance with programs stored in the microcomputer shown in FIG. 4.

FIG. 5 is a flowchart showing the processing steps of the spoken-instruction controlled system according to the present invention shown in FIG. 4.

With reference to FIGS. 4 and 5, when the recognition switch 3 is first depressed, an input port terminal 1 to which the recognition switch 3 is connected via an inverter 18 is set to "1", that is, "H-voltage level" (block 1). In response to this signal, all the output port terminals 1, 2, and 3 are reset to "0", that is, "L-voltage level" (block 2). To the output port terminal 1, the electronic tuner 14 is connected via an inverter 22' for performing automatic tuning operation. To the output port terminal 2, the set terminal S of the shift register 21 is connected for sequencially setting the shift register 21. To the output port terminal 3, the reset terminal R of the shift register 21 is connected for resetting the shift register 21. In this state, the microcomputer 200 stands by a spoken instruction inputted thereto through the microphone 2 and the bandpass filters 8 (block 3). When a spoken instruction is inputted, the program executes the necessary processing for recognizing the inputted spoken phrase signal as one of the stored reference spoken instructions (block 4). Next, the program determines whether the inputted spoken phrase is resemble to "Tuning". If resemble to "Tuning", flag "a" rises (block 5). If not resemble to "Tuning", the program determines whether the inputted spoken phrase is resemble to "Channel". If resemble to "Channel", flag "b" rises (block 6). When both the flags do not rise, the program returns to the original state. In response to the flag b, a counter function provided in the CPU is reset to "0" (block 7). After reset, the counter function starts counting;' that is, the counted value is incremented (block 8). Next, the counted value is compared with a predetermined time period, for instance, 20 seconds; that is, the program determines whether the counted value reaches 20 seconds (block 9). If within 20 seconds, the program determines whether the input port terminal 1 is set to "1" again; that is, the recognition switch is depressed again (block 10). If set to "1", the output port terminal 2 is set to "1" in order to set the shift register 21, so that a channel corresponding to the terminal $Q_1$ is selected (block 11) and the program returns to block 7 to reset the counter function to "0" again. After reset, the counter function starts counting again (block 8). If the input port terminal 1 is set to "1" again (the switch 3 is depressed again) within 20 seconds (blocks 9, 10), the output port terminal 2 is set to "1" again to increment the shift register 21 to $Q_2$, so that a channel corresponding to the terminal $Q_2$ is sequentially selected again (block 11). If the input port terminal 1 is reset to "0" (the switch 3 is released) within 20 seconds (blocks 9, 10), the output port terminal 2 is set to "0" (block 12); that is, the shift register 21 is not shifted. After that the program returns to block 8 to increment only the counter value.

In block 11, since the program returns to block 7 to reset the counter to "0" whenever the switch 3 is depressed within 20 seconds, the output port terminal 2 is set to "1" to sequentially shift the shift register 21 from $Q_1$ to $Q_5$. As understood, it is possible to sequentially select the channels corresponding to the shift register terminals $Q_1$ to $Q_5$ by depressing the recognition switch 3 repeatedly within a predetermined time period (e.g. 20 sec).

Further, in this case, if the counted value exceeds 20 seconds in block 9, the program returns to the original state.

In block 5, if the inputted spoken phrase is resemble to "Tuning", the flag "a" rises. In response to the flag "a", the counter function is reset to "0" (block 13). After reset, the counter starts counting; that is, the counter value is incremented (block 14). Next, the counted value is compared with a predetermined time period, for instance, 20 seconds; that is, the grogram determines whether the counted value reaches 20 seconds (block 15). If within 20 seconds, the program determines whether the input port terminal 1 is set to "1" again; that is, the recognition switch is depressed again (block 16). If set to "1", the output port terminal 1 is set to "1" in order to perform automatic tuning after inverted via the inverter 22' (block 17) and the program returns to block 13 to reset the counter function to "0". After reset, the counter starts counting (block 14). If the input port terminal 1 is set to "1" again (the switch 3 is depressed again) within 20 seconds (block 15, 16), the output port terminal 1 is set to "1" again, so that a tuner tunes the radio to the next radio frequency (block 17). If the input port terminal 1 is reset to "0" (the switch 3 is released) within 20 seconds (blocks 15, 16), the output port terminal 1 is reset to "0" (block 18), without tuning the radio to the next radio frequency. After reset, the program returns to block 14 to increment only the counted value.

In blocks 17, since the program returns to block 13 to reset the counter to "0" whenever the switch 3 is depressed within 20 seconds, the output port terminal 1 is set to "1" to repeatedly tune the radio to the succeeding frequencies. As understood, it is possible to repeatedly tune the radio to the broadcasting stations by depressing the recognition switch 3 repeatedly within a predetermined time period (e.g. 20 sec).

Further, in this case, if the counted value exceeds 20 seconds in block 15, the program returns to the original state.

Next, the recognition switch according to the present invention iwll be described hereinbelow. Conventionally, the recognition switch 3 is mounted on a steering column, in more detail, on top of a knob of the lever attached on the steering column for controlling the front side and flasher indicator lamp.

FIG. 6 shows a position at which there is disposed the recognition switch 3 for use in the spoken-instruction controlled system according to the present invention. Although it is of course possible to depress the recognition switch 3 by the hand, since the hands usually grip the steering wheel, in this embodiment, the recognition switch 3 is depressed by a driver's foot, instead of the finger. The switch 3 is disposed by the side of the accelerator pedal 30 and in the inside wall of the passenger compartment. The switch 3 can be depressed when the driver moves sideways the right-hand foot which is put on the accelerator pedal. When a spoken instruction is given to the speech recognizer 100 with this recognition switch 3 kept depressed, the spoken instruction can be recognized and also the automatic tuning and channel selection can be performed.

FIG. 7 shows an embodiment of the accel-pedal side recognition switch for use in the spoken-instruction controlled system according to the present invention.

In the figure, the reference numeral 31 denotes an elongated channel-shaped switch casing with grooves in the opposing wall, the reference numeral 32 denotes an elastic member with a flange at the end thereof so formed as to be compressed to fit into the channel-shaped switch casing 31 and firmly engage with the grooves of the switch casing 31, and the reference numerals 33 and 34 denote a pair of conductive ribbon contacts fixed to the flat surface of the elastic member 32 and to the inside elongated flat surface of the channel-shaped switch casing 31, respectively, with a space therebetween. When the side portion of the driver's foot depresses the elastic member 32, the conductive ribbon contact 33 is brought into contact with the other conductive ribbon contact 34 to close the recognition switch 3. Since this recognition switch 3 is long, when the foot is slightly put somewhere on the elastic member 32, the switch 3 can be closed. Therefore, it is not necessary for the driver to remember the position at which the switch 3 is disposed.

Furthermore, since the switch 3 is disposed by the side of the accelerator pedal, the driver can depress it by moving sideways his foot put on the accelerator pedal; that is, while depressing the accelerator pedal.

The present invention has been described of the system for car-radio broadcasting station tuning or channel selection by way of example; however, the system according to the present invention is appliable to various systems to be activated repeatedly or sequentially such as remote-control fender-mirror adjusting system, air-condition fan-speed adjusting system, air-condition temperature adjusting system, power-operated window opening/closing system, etc.

As described above, in the spoken-instruction controlled system according to the present invention, since a spoken instruction inputted thereto when the recognition switch is kept depressed is recognized by the speech recognizer, since the recognized spoken instruction signal is held therein for a predetermined time period, and since actuators acording to the recognized spoken instruction signal can be activated repeatedly or sequentially, in such a case as automatic car-radio tuning or channel selection where the same spoken instruction is required to repeat until a preferable program or station can be selected, it is possible to repeatedly or sequentially activate the actuators by only depressing the recognition switch repeatedly after a spoken instruction has been once recognized.

Further, since the recognition switch for the speech recognizer is usable for repeatedly or sequentially activating the actuators, it is not necessary to provide an additional switch.

Furthermore, since the recognition switch is disposed by the side of the accelerator pedal, it is possible to close the switch by moving the driver's foot sideways even while the accelerator pedal is being depressed, instead of depressing the switch by the driver's finger.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A spoken-instruction controlled system for an automotive vehicle which can activate an actuator in response to a predetermined spoken instruction inputted through a microphone, which comprises:
    (a) recognition switch for outputting a recognition switch signal when closed;
    (b) a speech recognizer responsive to said recognition switch signal for outputting a command signal in response to the predetermined spoken instruction inputted thereto through the microphone when said recognition switch is first closed;
    (c) means for holding the command signal from said speed recognizer for a predetermined time period; and p1 (d) means responsive to said holding means and said recognition switch signal for outputting an actuator signal repeatedly when said recognition switch is closed repeatedly while said holding means is holding the command signal.

2. A spoken-instruction controlled system for an automotive vehicle as set forth in claim 1, wherein said holding means is a retriggerable multivibrator which is first triggered by the command signal and then retriggered when said recognition switch is closed.

3. A spoken-instruction controlled system for an automotive vehicle as set forth in claim 1, wherein said actuator-signal outputting means is an AND gate, an input terminal of which is connected to said recognition switch, the other input terminal of which is connected to said holding means, and the output terminal of which is connected to the actuator.

4. A spoken-instruction controlled system for an automotive vehicle which can activate at least one actuator in response to at least one predetermined spoken instruction inputted through a microphone, which comprises:
    (a) a recognition switch connected to a DC voltage $V_D$ and ground for outputting a L-voltage level recognition switch signal $e_{rs}$ when closed but a H-voltage level signal $V_D$ when opened;
    (b) a two-circuit analog switch including a first switch unit and a second switch unit and connected to said recognition switch and the DC voltage $V_D$, the first switch unit outputting a H-voltage level signal $V_D$ when deactivated but a H- or L-voltage level signal $V_D$ or $e_{rs}$ when activated, the second switch unit outputting a H- or L-voltage level signal $V_D$ or $e_{rs}$ when deactivated but a H-voltage level signal $V_D$ when activated;
    (c) a speech recognizer connected to the second switch unit of said two-circuit analog switch for outputting a first command signal $e_t$ from a first output terminal 100a thereof in response to the first predetermined spoken instruction and a second commnd signal $e_c$ from a second output terminal 100b thereof in response to the second predetermined spoken instruction both inputted through the microphone when said recognition switch is kept closed for applying the L-voltage level signal $e_{rs}$ thereto via the second switch unit of said two-circuit analog switch only while said two-circuit analog switch is being deactivated;
    (d) an inverter connected to the first switch unit of said two-circuit analog switch for inverting the signal $e_{rs}$ outputted from the first switch unit and outputting a signal $e_{rs}'$ corresponding thereto;
    (e) a first analog switch connected to said inverter and the first output terminal 100a of said speech recognizer for outputting the first command signal $e_t$ when deactivated but the inverted recognition switch signal $e_{rs}'$ when activated;
    (f) a first AND gate one input terminal of which is connected to said first analog switch;
    (g) a first retriggerable timer unit connected to said first AND gate for outputting a H-voltage level timer signal $e_{rt1}$ for a predetermined time period when triggered in response to the first command signal $e_t$ inputted via said deactivated first analog switch and said first AND gate and when retriggered in response to the inverted recognition switch signal $e_{rs}'$ inputted via said activated first analog switch and said first AND gate;
    (h) a second analog switch connected to said inverter and the second output terminal 100b of said speech recognizer for outputting the second command signal $e_c$ when deactivated and the inverted recognition switch signal $e_{rs}'$ when activated;
    (i) a second AND gate one input terminal of which is connected to said second analog switch, the other inverted input terminal of which is connected to said first retriggerable timer unit;
    (j) a second retriggerable timer unit connected to said second AND gate, the output terminal of which is connected the other inverted input terminal of said first AND gate 24, for outputting a H-voltage level timer signal $e_{rt2}$ for a predetermined time period when triggered in response to the second command signal $e_c$ inputted via said deactivated second analog switch and said second AND gate and when retriggered in response to the inverted recognition signal $e_{rs}'$ inputted via said activated second analog switch and said second AND gate;
    (k) an OR gate two input terminals of which are connected to said first and second retriggerable timer units, respectively, for outputting a switch control signal $e_s$ to said two-circuit analog switch and said first and second analog switches to activate them when either of the two signals $e_{rt1}$ and $e_{rt2}$ is inputted thereto;
    (l) an NAND gate, one input terminal of which is connected to said inverter and the other input terminal fo which is connected to said first retriggerable timer unit for outputting a L-voltage level signal to an actuator to activate it repeatedly when the inverted recognition signal $e_{rs}'$ and the timer signal $e_{rt1}$ are both at a H-voltage level at the same time; and (m) a shift register the set terminal of which is connected to said inverter and the reset terminal of which is connected to said second retriggerable timer unit for outputting a H-voltage level signal sequentially to a plurality of other actuators to activate them from each of output terminals thereof whenever the inverted recognition switch signal $e_{rs}'$ is inputted to the set terminal thereof after reset in response to the timer signal $e_{rt2}$.

5. A spoken-instruction controlled system for an automotive vehicle as set forth in claim 4, which further comprises:

(a) an OR gate, one input terminal of which is connected to said speech recognizer for receiving the tuning command signal $e_t$, the other inverted input terminal of which is connected to the NAND gate for receiving the first retriggerable timer signal $e_{rt1}$; and (b) a one-shot multivibrator connected to said OR gate for outputting a tuning actuator signal $e_{at}$ for a predetermined time period when triggered by one of the signal $e_t$ and the signal $e_{rt1}$, whereby the actuator can be activated by the tuning command signal $e_t$ directly when a spoken instruction "Tuning" is first inputted to the system through the microphone.

6. A spoken-instruction controlled system for an automotive vehicle which can activate at least one actuator in response to at least one predetermined spoken instruction inputted through a microphone, which comprises:

(a) recognition switch for outputting a recognition switch signal $e_{rs}$ when depressed; and (b) a microcomputer including an analog-to-digital converter, a central processing unit, a read-only memory, a random-access memory, an input port, and an output port, said analog-to-digital converter of which is connected to the bandpass filters, and said input port of which is connected to said recognition switch, in response to the recognition switch signal $e_{rs}$ said microcomputer outputting a command signal $e_t$ corresponding to the spoken instruction transduced through said microphone to be one of the actuators when said microcomputer determines the transduced spoken instruction to be one of reference spoken instruction previously stored therein, resetting a counting function in said central processing unit to zero and incrementing the counting function in response to the command signal $e_t$, determining whether a predetermined time period has elapsed, determining whether the recognition switch signal $e_{rs}$ is inputted thereto if less than the predetermined time period, standing-by the succeeding spoken instruction if more than the predetermined time period, outputting an actuator signal $e_{at}$ if the recognition switch signal $e_{rs}$ is inputted thereto within the predetermined time period and then resetting the counting function to zero again, and outputting no actuator signal if the recognition switch signal $e_{rs}$ is not inputted thereto within the predetermined time period and then incrementing the counting function again.

7. A spoken-instruction controlled system for an automotive vehicle as set forth in claim 6, wherein said microcomputer further comprises the steps of ORing the command signal $e_t$ and the inward actuator signal $e_{at}$ and outputting a signal corresponding thereto for a predetermined time period.

8. A spoken-instruction controlled system for an automotive vehicle as set forth in claim 6, which further comprises a shift register, the set and reset terminals of which are connected to said microcomputer and output terminals of which are connected to a plurality of actuators, respectively, said shift register being activated in response to the command signal for a predetermined time period and shifted in response to the recognition switch signal $e_{rs}$ for activating the actuators sequentially.

9. A spoken-instruction controlled system for an automotive vehicle as set forth in any of claims 1, 2, 3, 4, 5, 6, 7 or 8 wherein said recognition switch is disposed by the side of an accelerator pedal.

10. A spoken-instruction controlled system for an automotive vehicle as set forth in claim 9, wherein said recognition switch disposed by the side of an accelerator pedal comprises:

(a) an elongated channel-shaped member with grooves in the opposing wall;

(b) an elastic member with a flange at the end thereof so dimensioned as to be compressed to fit into said channel-shaped member and firmly engages with the grooves of said channel-shaped member; and (c) a pair of conductive ribbon contacts fixed to the flat surface of said elastic member and to the inside elongate flat surface of said channel-shaped member, respectively, with a space therebetween.

11. In a spoken-instruction controlled system for an automotive vehicle which can activate at least one actuator in response to at least one predetermined spoken instruction inputted through a microphone, the method of actuating the actuator repeatedly, which comprises the following steps of:

(a) generating a recognition switch signal $e_{rs}$;

(b) resetting the actuator in respnse to the recognition switch signal $e_{rs}$;

(c) inputting a spoken instruction through the microphone while the recognition switch signal $e_{rs}$ is being generated;

(d) recognizing the inputted spoken instruction as the one corresponding to the actuator and outputting a command signal $e_t$;

(e) resetting a counter function to "0" in response to the signal $e_t$;

(f) incrementing the counter function;

(g) determining whether the counted value exceeds a predetermined time period;

(h) if the counted value exceeds the predetermined time period, returning to step (a) for standing-by the succeeding recognition switch signal $e_{rs}$;

(i) if the counted value does not exceed the predetermined time period, determining the recognition switch signal $e_{rs}$ is generated again;

(j) if generated again, activating the actuator repeatedly and returning to step (e) for resetting the counter function to "0" again;

(k) if not generated again, returning to step (f) for incrementing the counter function again.

12. In a spoken-instruction controlled system for an automotive vehicle which can activate at least one actuator in response to at least one predetermined spoken instruction inputted through a microphone, the method of actuating a plurality of actuators sequentially, which comprises the following steps of:

(a) generating a recognition switch signal $e_{rs}$;
(b) resetting a shift register in respnse to the recognition switch signal $e_{rs}$;
(c) inputting a spoken instruction through the microphone while the recognition switch signal $e_{rs}$ is being generated;
(d) recognizing the inputted spoken instruction as the one corresponding to the actuators and outputting a command signal $e_t$;
(e) resetting a counter function to "0" in response to the signal $e_t$;
(f) incrementing the counter function;
(g) determining whether the counted value exceeds a predetermined time period;
(h) if the counted value exceeds the predetermined time period, returning to step (a) for standing-by the succeeding recognition switch signal $e_{rs}$;
(i) if the counted value does not exceed the predetermined time period, determining the recognition switch signal $e_{rs}$ is generated again;
(j) if generated again, shifting the shift register sequentially and returning to step (e) for resetting the counter function to "0" again;
(k) if not generated again, returning to step (f) for incrementing the counter function again.

* * * * *